CONTROL CIRCUIT FOR A FIELD START RELAY IN
A CODE TYPE COMMUNICATION SYSTEM
Filed June 18, 1957
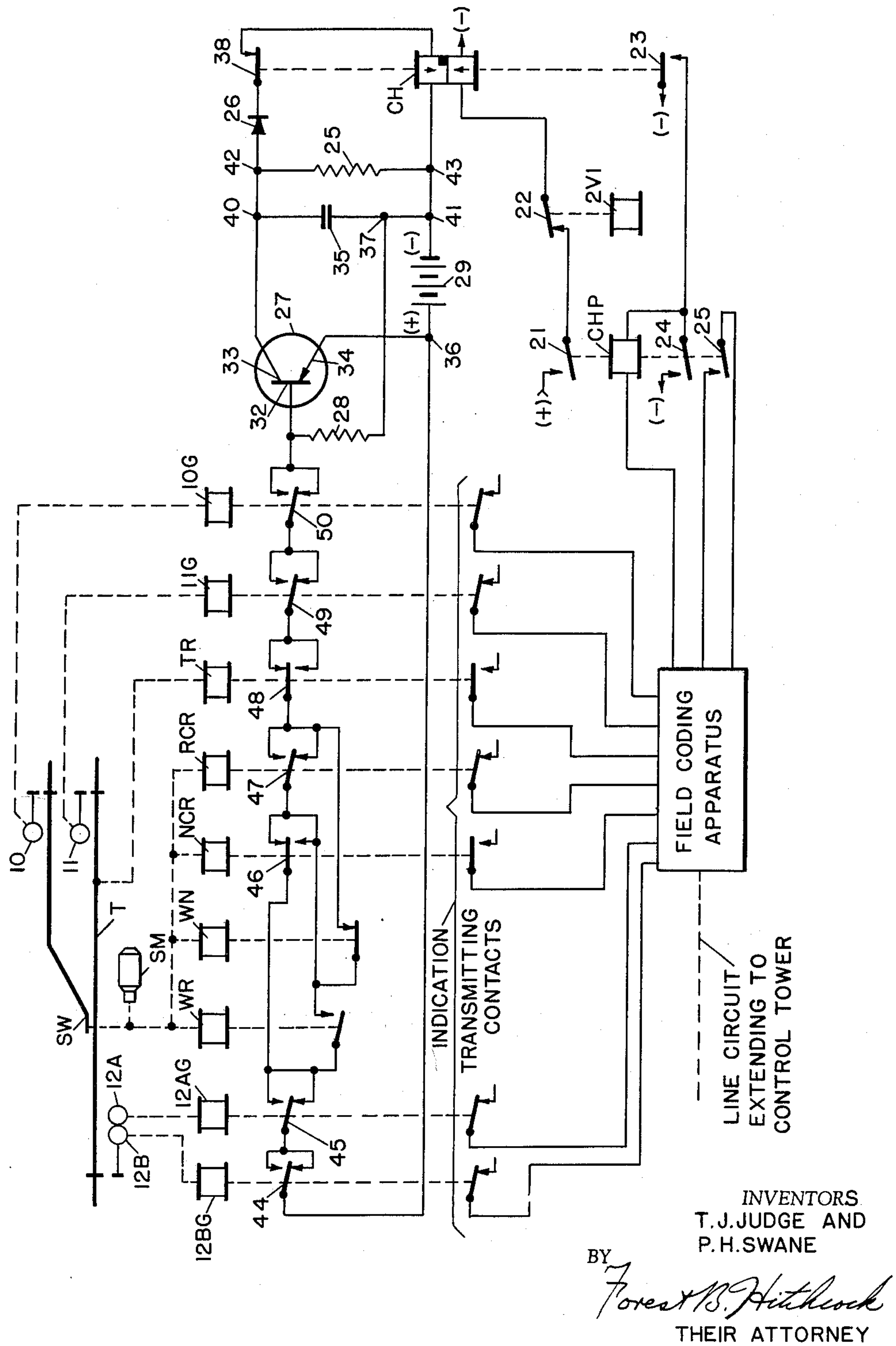
INVENTORS
T. J. JUDGE AND
P. H. SWANE
BY Forest B. Hitchcock
THEIR ATTORNEY

United States Patent Office 2,976,402

Patented Mar. 21, 1961

2,976,402

CONTROL CIRCUIT FOR A FIELD START RELAY IN A CODE TYPE COMMUNICATION SYSTEM

Thomas J. Judge and Peter H. Swane, Rochester, N.Y., assignors to General Railway Signal Company, Rochester, N.Y.

Filed June 18, 1957, Ser. No. 666,360

6 Claims. (Cl. 246—5)

This invention relates generally to centralized traffic control systems for railroads, and more particularly to a control circuit for a field start indication relay employed in connection with such centralized traffic control systems.

In the typical code type communication system for centralized traffic control to which this invention relates in general, code transmitting apparatus at each of the various field stations is utilized for transmitting to the control office indications of the position or condition of various traffic controlling devices at a corresponding field location, such as the position of a power operated track switch, the aspect displayed by certain signals, or the occupied or unoccupied condition of a certain section of track. In order that these indications may be transmitted as soon as there is any change in their position or condition, it is common practice to provide suitable automatic field start means to condition the coding apparatus at a field station for operation whenever such a change occurs. In accordance with present practice a normally energized neutral relay commonly called a "change" relay is deenergized and dropped away by a change in the indication of a traffic controlling device, which dropping away initiates the transmission of the new indication. After the indication has been transmitted the "change" relay is again energized thereby being in condition to respond to another change in the indication of any one of the traffic controlling devices. During the times when there is no transmission of indications, which time is commonly called a "period of rest," the "change" relay is constantly consuming energy to maintain it in an energized condition so as to be conditioned for the transmission of another change in the indication of any one of the traffic controlling devices. In many field locations primary batteries are the only available source of energy, therefore deeming it desirable to conserve anergy wherever possible, while still maintaining the requirements of safe railway signaling practice. Even in the situation where storage batteries are charged from a commercial power line, a smaller size of storage battery can be utilized, or in case of power failure, standby batteries can operate for a longer length of time.

Generally speaking, and without attempting to define the nature and scope of the present invention, it is proposed to provide a control circuit for initiating an automatic field start upon the change of any one or more of a plurality of traffic controlling devices which will consume substantially less energy during periods of rest.

The primary object or purpose of the present invention is to provide an improved field start control circuit for transmitting a change in traffic indications which employs a relay held in an energized condition by a permanent magnet, which may be called a "magnetic stick" relay.

Another object of the present invention is to provide an improved control circuit for deenergizing an energized magnetic stick field start relay so as to be responsive to the momentary opening of an indication control circuit caused by a change in the indication of one or more traffic controlling devices.

A still further object of this invention is to provide a field start indication circuit employing a magnetic stick relay which is capable of deenergizing the relay to a knock-down position by an energy pulse of a short duration as measured by the crossover time of a relay.

A further object of the present invention is to provide an improved transistorized control circuit for energizing the winding of a relay in response to an input pulse of a short duration.

A still further object of the present invention is to provide an improved energizing circuit for a relay which supplies energy to the winding of the relay after the energizing pulse has ceased.

Various other objects, characteristic features, attributes and advantages of the invention are more conveniently considered hereinafter in connection with a detailed description of one specific embodiment of the invention.

The accompanying drawings shows diagrammatically and conveniently one form of the invention applied to the transmission of indications for the position of a track switch, track occupancy indicators and signal indications in connection with a typical railroad passing siding.

In this drawing connections to the opposite terminals of a battery or other suitable source of current are indicated by arrows and the symbols (+) and (−).

The present invention is applicable to any type of code communication system suitable for centralized traffic control systems, but in the interest of simplicity, only one particular embodiment of the invention has been illustrated in connection with a code communication system of the type known and described in prior patents such as W. D. Hailes et al., No. 2,399,734, dated May 7, 1946 and T. J. Judge, No. 2,138,863, dated December 6, 1938 to which reference is made for a more detailed description thereof.

In the automatic field start control circuits as described in the above mentioned patents, the desired field start is created when the stick circuit of a normally energized neutral "change" relay is opened by a momentary interruption caused by a change in the position of a switch, occupancy of a track section, or the displayed indication of a signal. Also in the above described patents the change of indication of a switch or signal causes an associated traffic indication relay contact to change its front or back position. It is the change of position of the contacts of the associated traffic indication relay which opens the stick circuit, thereby dropping away the "change" relay. Because of the short duration of time involved in the crossover of a traffic indication relay from its front to its back contact, a "change" relay having quick drop-away characteristics is of necessity employed.

The present invention proposes to control the transmission of an automatic field start by employing a magnetic stick relay as the "change" relay, which relay is held in an energized position by a permanent magnet and can be deenergized during the crossover time of any one of the traffic indication relays.

Without attempting to define its scope, this invention permits a magnetic stick type relay to be reliably employed in a field start control circuit as a "change" relay.

The magnetic stick "change" relay CH shown is assumed to be of the conventional type, wherein it is picked up by the energization of a pick-up winding. After being picked up, the relay is held in the energized position by a permanent magnet. The relay has another winding commonly called a "knock-down winding" which when sufficiently energized neutralizes the holding flux of the permanent magnet permitting the relay to assume a deenergized position.

With the benefit of the present invention, a magnetic stick relay can be reliably operated in response to the crossover time of a traffic indication relay in a manner which will be pointed out in detail as the description of the invention progresses.

Under test conditions it has been determined that the crossover time of the contacts of a traffic indication relay of the type normally used in railway signaling practice is in the neighborhood of 10 milliseconds, while the length of time necessary to build up the required flux to neutralize the permanent holding magnet of the typical 90 ohm magnetic stick relay in the neighborhood of 50 milliseconds with 10 volts of direct current applied to the knock-down winding.

The drawing illustrates the invention as applied to a typical track layout comprising a single switch SW assumed to be located at the end of a passing siding of a single track railroad. The signals 10 and 11 by displaying a stop or proceed indication are assumed to govern traffic going from right to left. The signals 12A and 12B are assumed to govern traffic going from left to right. The track switch SW is assumed to be operated by the usual power operated switch machine SM to a normal and reverse position.

In the particular arrangement shown it is assumed that the indications of the "clear" or "stop" condition of the respective signals 10, 11, 12A and 12B, the occupancy of the track section T, and the position of the switch SW will be transmited to a control tower over a conventional line circuit. The automatic field start for the signal indications and the nature of the indication to be transmitted are determined by the relays 10G, 11G, 12AG and 12BG for the signals 10, 11, 12A and 12B, respectively. Likewise, it is assumed that the field start for the switch indication and the transmission of the normal or reverse call of the switch SW is controlled by the relays WN and RCR for the reverse position, and the relays WR and NCR for the normal call. In the illustration shown an indication will be transferred in respect to the switch position only when the actual position of the switch is in correspondence with the controlled position. The relay TR similarly affects the field start circuit with respect to the occupancy of a conventional track section T.

The field station coding apparatus is shown schematically in block form and is conditioned for operation by the deenergization of the magnetic stick relay CH. This coding apparatus is operated in the usual manner, characteristic of systems of this type, to transmit at the appropriate time during the operating cycle indications of the then existing condition of all of the signal indication relays 10G, 11G, 12AG and 12BG, the switch position indicating relays NCR and RCR, and the track occupancy relay TR, by reason of the fact that contacts associated with these relays govern the energization of indication control circuits shown diagrammatically which determine the character of the indication code elements. An indication code is transmitted in accordance with the position of the traffic indication relays by the closure of the back contact 23 of the magnetic stick change relay CH. The closure of its back contact 23 energizes the change repeater relay CHP which is held energized by a stick circuit including its front contact 24 thus storing the field start until the apparatus is ready to transmit. The field coding apparatus is ready for transmission by the closure of front contact 25 of relay CHP. The relay CH is then restored by a pick-up circuit readily traced from (+), and includes front contact 21 of the relay CHP, back contact 22 of the relay 2V1, and the pick-up winding of the relay CH, to (−).

The CH relay is so associated with the coding apparatus that it is effective to transmit a change of indication regardless of when it occurs. If a change of indication should occur during the first part of the transmission cycle, the particular change of indication will be transmitted during the same cycle. If a change should occur midway in the cycle after the pick-up circuit for the CH relay has been interrupted by the opening of contact 22 of the relay 2V1, the CH relay is able to respond to this further change, thereby being in condition to again energize relay CHP after the latter has been deenergized by the interruption of its stick circuit in the latter part of the transmitting cycle. A more detailed explanation of the operation of the CH relay in association with the coding apparatus is disclosed in the aforementioned prior patents.

A battery 29 is illustrated and provides the necessary direct current for operating the control circuit. This battery may be capable of delivering a voltage of, for example, 19 to 30 volts in the example given.

A transistor generally designated by the reference numeral 27 comprises a body of N-type semi-conducting material. The body of semi-conducting material may be composed of germanium, silicon, or selenium containing a minute but significant number of atomic impurities. In addition to the body, the transistor consists of a base electrode 32, an emitter electrode 34 and a collector electrode 33. It should be understood that the transistor 27 can also be of a type composed of P-type semi-conductive material, the appropriate changes being made in the battery potentials. The emitter 34 is connected to the positive terminal of battery 29. The base 32 is connected through a resistor 28 to the negative terminal 37 of the battery 29. The collector 33 is connected through a diode 26 and a front contact 38 to one terminal of the neutralizing winding of the change relay CH.

A standard capacitor 35 has one terminal connected to the collector 33 at the junction 40 and its other terminal connected to the negative terminal of the direct current source 29 at the junction 41. The capacitor 35 is adapted to become charged while the transistor is conducting and discharges when the transistor has stopped conducting as will be described in more detail in connection with the description of the operation of the control circuit. A resistor 25 is connected across the collector 33 at the junction 42 and the negative terminal of the battery 29 at the junction 43. Although this resistor 25 is not necessary to the operation of the control circuit it is desirable in that it prevents the capacitor from charging when the transistor 27 is not conducting.

The asymmetric current conducting device or diode 26 prevents reverse current from flowing across the collector junction of the transistor 27 which reverse current causes a voltage drop across the base in a direction to forward bias the emitter base junction. This reversal of current occurs when a pulse of current either builds up or decays in the pick-up winding of relay CH causing an inductive or transformer action in the neutralizing winding of the relay CH. However, the transistor 27 could also be protected by externally biasing the base 32.

Each one of the traffic indication relays has front and back contacts which are so connected with each other that they constitute a shunting circuit between the emitter 34 and the base 32 of the transistor 27. It is readily apparent that with all of the contacts of the traffic indication relays in a closed position, the base 32 of the transistor and the emitter 34 are at the same positive potential. In the condition illustrated the shunting circuit can be traced from the positive terminal of the battery 29, the junction point 36 of the emitter, the back contact 44 of the relay 12BG, back contact 45 of relay 12AG, front contact 46 of relay NCR, back contact 47 of relay RCR, front contact 48 of relay TR, back contact 49 of relay 11G, and back contact 50 of relay 10G, to the base 32 of the transistor 27. With the aforementioned circuit in a closed position there is little or no current flowing in the collector portion 33 of the transistor 27 thus causing the transistor to behave similar to a switch in the "open"

condition thereby preventing current from energizing the neutralizing winding of the magnetic stick relay CH.

Although the typical values of the circuit constants in one practical application have been described, it is to be understood that other values can be chosen as long as the capacitor 35 will charge to a value sufficient to provide enough energy, together with the current flow from the transistor 27 during the crossover period of 10 milliseconds of a traffic indication relay to operate the relay CH.

As a typical example of the functions and mode of operation of the automatic field start means constituting the present invention, it is assumed that the signal 10 changes its displayed aspect causing the relay 10G to shift its contact finger 50 from a back to a front position; and during this movement of the contact 50 there is a momentary interruption in the shunting circuit for the transistor 27. The momentary interruption of the shunting circuit caused by the crossover of the relay 10G, results in the transistor being placed in the "on" condition because the emitter to base junction is "forward biased," that is, the base 32 is negative with respect to the emitter 34. The negative current biasing the base 32 of the transistor flows through a circuit commencing at the negative terminal of the battery 29, junction 41, junction 37, resistor 28 and the base 32 of the transistor 27. The forward biased emitter junction 34 permits current to flow from the emitter 34 through the collector 33. The magnitude of this current will depend upon the magnitude of the base current and the particular current gain characteristics of the transistor. When the transistor is in the "on" condition part of the current flows through the diode 26, through the front contact 38 of the relay CH and the neutralizing winding of relay CH, and part through the capacitor 35 as charging current.

When the transistor 27 ceases the conduct or assumes an "off" condition because of the reclosing of contact 50 of relay 10G in the shunting circuit, the capacitor 35 discharges its supply of current to the neutralizing winding of the relay CH to further energize the winding of the CH relay thereby causing it to assume a deenergized position. The capacitor 35 is assumed to have a suitable discharge time, so that the input current to the CH relay neutralizing winding flows a sufficient length of time after the transistor has ceased to conduct to insure the dropping away of the CH relay regardless of the crossover time of one of the traffic indication relay contacts.

Regarding the consumption of current during "periods of rest," the results of a test under actual operating conditions showed approximately two milliamperes of current flow in the circuit with the transistor in its "off" condition. Without the benefit of this invention and using a neutral stick relay it was discovered that one hundred milliamperes of current flow is necessary to maintain the "change" relay energized during "periods of rest."

The particular embodiment of the inevention shown and described in merely illustrative of the nature and character of the invention, and it is to be understood that various adaptations, modifications, and additions may be made to the particular organization of parts and circuits illustrated without departing from the invention.

What I claim is:

1. In a centralized traffic control system for railroads, a plurality of traffic controlling devices at a particular location, a transistor, a direct current source, a relay normally held in an energized position by a permanent magnet, a first circuit means including said direct current source for applying a biasing potential to said transistor only during operation of any one of said traffic controlling devices, and circuit means including said transistor for neutralizing the flux of the permanent magnet of said relay in response to the current output of said transistor as rendered effective by said first circuit means.

2. In a normally at rest code communication system for railway centralized traffic control, automatic initiating means responsive to a shift from one position to another of contacts of any one of a plurality of respective devices for initiating a cycle of operation of the code communication system comprising, a two position normally deenergized magnetic stick relay having a knock-down winding effective when actuated by energization of said knock-down winding to initiate said code communication apparatus into a cycle of operation, electronic switching means effective when rendered conductive to energize said knock-down winding of said relay and thereby initiate said code communication apparatus, circuit means including said contacts of said devices in series for rendering said electronic switching means conductive only for the cross-over time of said contacts from said one position to another position, and energy storage means including a capacitor subject to charge when said electronic switching means is rendered conductive, and subject to discharge through said knock-down winding when said electronic switching means is nonconductive, whereby the energization of said knock-down winding is sustained for a period of time greater than the time during which said electronic switching means is conductive to insure the actuation of said relay to initiate said code communication apparatus.

3. In a normally at rest code communication system for centralized traffic control, automatic initiating means responsive to a shift from one position to another of contacts of any one of a plurality of respective devices for initiating a cycle of operation of the code communication system comprising, a two-position normally deenergized relay, means responsive to the energization of said relay for initiating said code communication apparatus into a cycle of operation, electronic switching means effective when rendered conductive to energize said relay and thereby initiate said code communication system, circuit means including said contacts of said devices in series for rendering said electronic switching means conductive only for the crossover time of said contacts from said one-position to another position, and energy storage means including a capacitor subject to charge when said electronic switching means is rendered conductive and subject to discharge through a winding of said relay when said electronic switching means is non-conductive for maintaining energization of said relay momentarily after said electronic switching means has been rendered nonconductive to insure actuation of the relay by providing energization for a time interval greater than the time of crossover of said contacts.

4. In a normally at rest code communication system, automatic initiating means according to claim 3 wherein said electronic switching means includes a transistor.

5. In a normally at rest code communication system, automatic initiating means according to claim 4 wherein control means is provided for the transistor for rendering said transistor conductive only for the time of crossover of said contacts from one position to another.

6. In a normally at rest code communication system, automatic initiating means according to claim 5 wherein the transistor has base, collector and emitter elements, and means is provided for energizing said relay through said emitter and collector elements only for the crossover time of said contacts.

References Cited in the file of this patent

UNITED STATES PATENTS

| | | |
|---|---|---|
| 2,409,696 | Lewis | Oct. 22, 1946 |
| 2,652,460 | Wallace | Sept. 15, 1953 |
| 2,750,453 | Pritchard | June 12, 1956 |
| 2,762,464 | Wilcox | Sept. 11, 1956 |
| 2,786,938 | Coley | Mar. 26, 1957 |

OTHER REFERENCES

Principles of Transistor Circuits, by R. F. Shea, published by John Wiley & Sons, fifth printing, August 1955, page 504. (Copy in Div. 48.)